No. 609,424. Patented Aug. 23, 1898.
J. L. FOWLER.
VEHICLE WHEEL.
(Application filed Sept. 29, 1897.)
(No Model.)
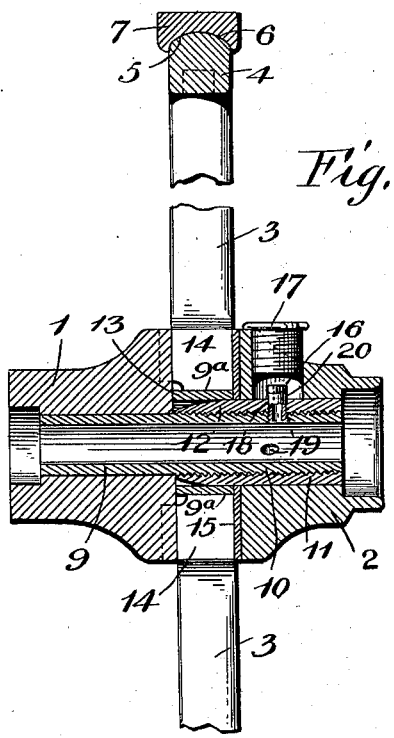
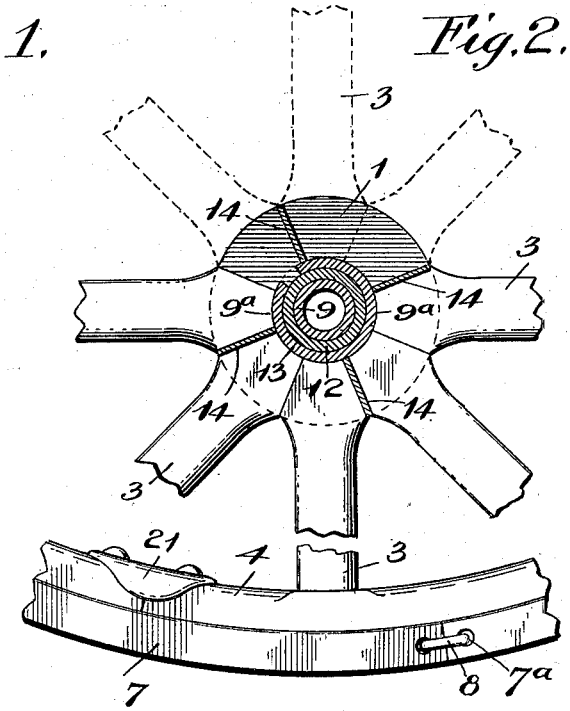
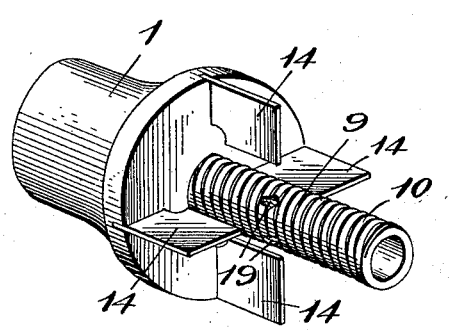
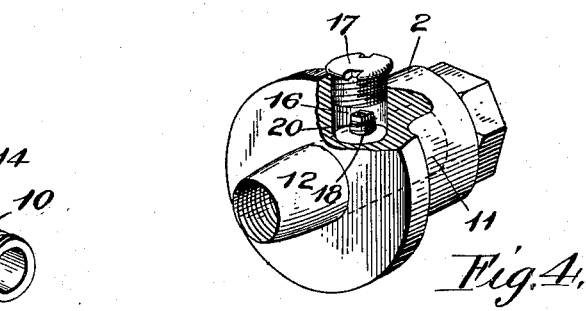
Witnesses
Inventor
Joseph L. Fowler.
By his Attorneys,
C. A. Snow & Co.

UNITED STATES PATENT OFFICE.

JOSEPH LAYFAYETT FOWLER, OF COAL CREEK, TENNESSEE, ASSIGNOR OF ONE-HALF TO J. L. HUMPHREY, OF SAME PLACE.

VEHICLE-WHEEL.

SPECIFICATION forming part of Letters Patent No. 609,424, dated August 23, 1898.

Application filed September 29, 1897. Serial No. 653,531. (No model.)

*To all whom it may concern:*

Be it known that I, JOSEPH LAYFAYETT FOWLER, a citizen of the United States, residing at Coal Creek, in the county of Anderson and State of Tennessee, have invented a new and useful Vehicle-Wheel, of which the following is a specification.

The invention relates to improvements in wheels.

The object of the present invention is to improve the construction of wheels and to provide a simple and comparatively inexpensive one which will be strong and durable and which will automatically lubricate a journal.

Another object of the invention is to avoid weakening the inner ends of the spokes and to enable a spoke to be readily removed should it become broken or otherwise injured and be necessary to provide a new one.

Another object of the invention is to dispense with tire-bolts and to enable a tire to be readily tightened.

The invention consists in the construction and novel combination and arrangement of parts, as hereinafter fully described, illustrated in the accompanying drawings, and pointed out in the claims hereto appended.

In the drawings, Figure 1 is a sectional view of a wheel constructed in accordance with this invention, the section being taken longitudinally of the hub. Fig. 2 is a similar view of the central portion of the wheel, taken transversely of the hub. Fig. 3 is a detail perspective view of the inner section of the hub, illustrating the arrangement of the radial plates. Fig. 4 is a similar view of the outer section of the hub. Fig. 5 is a detail view of the tubular screw.

Like numerals of reference designate corresponding parts in the several figures of the drawings.

1 and 2 designate inner and outer sections of a hub which receives the inner ends of spokes 3, and the latter have their outer ends tenoned and fitted in spoke-sockets of a felly 4. The felly 4 is provided with a rounded outer edge 5, which is received within a corresponding groove 6 of a tire 7, whereby the ordinary tire-bolts are dispensed with. The ends of the tire may be welded together, but they are preferably provided with transverse perforations $7^a$, receiving a coupling loop or link 8, which will enable the tire to be readily taken up to tighten the parts of the wheel, if necessary.

The inner section 1 of the hub is secured to the inner end of a tubular section or axle-box 9, which has a smooth inner portion to fit the section 1 and which is threaded at its outer portion 10 to be engaged by an interiorly-threaded sleeve 11 of the outer section 2 of the hub. The sleeve 11 extends beyond the inner end of the section 2, and the extension 12 is located beneath the inner ends $9^a$ of the spokes, a split band 13 being interposed between the extension and the spokes. The inner ends $9^a$ of the spokes are regularly tapered, but not tenoned or weakened, and the inner section of the hub is provided at intervals with radial plates or flanges, which form spoke-sockets and which are preferably interposed between each pair of spokes, as clearly illustrated in Fig. 2 of the accompanying drawings; but the plates or flanges 14 may be located between all of the spokes, if desired. The outer section of the hub is adapted to be screwed inward on the threaded portion of the axle-box to clamp the inner ends of the spokes, and the extension 12 is tapered and is adapted to expand the band 13 and force the spokes outward to tighten the parts. This construction enables the spokes to be firmly clamped and permits ready access to them, so that a spoke may be readily removed should it become injured, and a new spoke can be quickly supplied.

A disk or washer 15 is interposed between the outer section 2 of the hub and the adjacent faces of the inner ends of the spokes, to prevent the latter from being worn by the outer section or injured by the same in tightening the wheel.

The outer section 2 of the hub is provided with a cylindrical recess 16, forming a lubricant-reservoir, and interiorly threaded, to be engaged by a threaded cap 17, which closes the mouth of the reservoir or receptacle. The sleeve 11 of the outer section 2 of the hub is provided with a threaded perforation 18, adapted to register with one of a series of threaded perforations 19 of the axle-box and to receive a tubular screw or plug 20, which engages the said perforations and which forms an oil-passage extending from the lubricant cavity or recess to the interior of the axle-box for lubricating the journal. A series of perforations is provided in the axle-box to enable the outer section to be adjusted to tighten the wheel without interfering with the lubrication of the journal. The tubular screw or plug 20 serves to lock the outer section of the hub to the axle-box and prevents the parts from accidentally unscrewing through the rotation of the wheel. The outer end of the screw or plug is polygonal and is adapted to be readily engaged by a wrench or other suitable tool for rotating it when it is desired to disengage it from the axle-box, so that the outer section of the hub may be rotated for tightening or adjusting the parts.

The ends of the felly are connected by a plate 21, which is curved to conform to the configuration of the felly, and it is provided with a perforation for the reception of a suitable fastening device, whereby it is secured to the felly.

The invention has the following advantages: The wheel is simple, inexpensive, strong, and durable, and it is adapted to have its parts readily tightened to the desired extent. Ready access to the spokes is provided, so that a spoke may be readily removed should it become injured. In tightening the spokes at the hub their inner ends are firmly clamped between the sections of the hub, and they are also expanded and forced outward by the tapering extension of the sleeve of the outer section. A self-oiling device is provided, and the means for lubricating the wheel also lock the sections of the hub to the axle-box and prevent the parts from accidentally unscrewing. Tire-bolts are dispensed with, and the felly is protected by the tire, which is provided with a recess for the reception of the felly.

Changes in the form, proportion, and minor details of construction may be resorted to without departing from the spirit or sacrificing any of the advantages of this invention.

What I claim is—

1. In a wheel, the combination of an inner hub-section, an axle-box extending from the inner hub-section, an outer hub-section mounted on the axle-box and provided with a sleeve extending beyond it and tapered, spokes, and a split band interposed between the inner ends of the spokes and the tapered portion of the sleeve, substantially as described.

2. In a wheel, the combination of an axle-box having a threaded outer portion and provided with a perforation, an inner hub-section connected with the inner end of the axle-box, an outer hub-section having a lubricant recess or reservoir and provided with a perforation adapted to register with that of the axle-box, said outer hub-section being interiorly threaded and engaging the axle-box, and a tubular screw fitting in said perforations, forming a lubricant-passage and locking the outer hub-section on the axle-box, substantially as described.

3. In a wheel, the combination of a threaded axle-box having a perforation, an inner hub-section mounted on the axle-box, an outer hub-section provided with a lubricant-recess, spokes interposed between the hub-sections, a threaded cap engaging the lubricant-recess, an interiorly-threaded sleeve arranged within the outer hub-section, engaging the axle-box and provided with a perforation, and a tubular screw engaging the perforations of the sleeve and the axle-box, substantially as described.

4. In a wheel, the combination of a tire provided at its ends with perforations and having a groove at its inner face, a felly fitting in the groove to dispense with tire-bolts, and a coupling loop or link passing through the perforations of the ends of the tire and detachably connecting the same, substantially as described.

5. In a wheel, the combination of an inner hub-section, an axle-box having a threaded outer portion extending from the inner hub-section, radial plates or flanges arranged at the inner end of said hub-section to form spoke-sockets and terminating short of the axle-box, an outer hub-section provided with an interiorly-threaded sleeve to engage the axle-box, said sleeve extending beyond the outer hub-section toward the inner hub-section and having its inner end tapered, the spokes, and a split band interposed between the inner ends of the spokes and the tapered inner end of said sleeve, substantially as described.

In testimony that I claim the foregoing as my own I have hereto affixed my signature in the presence of two witnesses.

JOSEPH LAYFAYETT FOWLER.

Witnesses:
C. C. REYNOLDS,
R. N. BAKER.